United States Patent
Hnat et al.

[11] Patent Number: 5,935,885
[45] Date of Patent: Aug. 10, 1999

[54] MANUFACTURE OF CERAMIC TILES FROM FLY ASH

[75] Inventors: James G. Hnat, Collegeville, Pa.; Akshay Mathur, Tampa, Fla.; James C. Simpson, Perkiomenville, Pa.

[73] Assignee: Vortec Corporation, Collegeville, Pa.

[21] Appl. No.: 08/954,422

[22] Filed: Oct. 20, 1997

Related U.S. Application Data

[63] Continuation of application No. 08/629,558, Apr. 9, 1996, abandoned.

[51] Int. Cl.$^6$ .................................................. C01F 7/04
[52] U.S. Cl. .................................. 501/1; 501/2; 501/57; 501/63; 501/69; 501/70; 501/155; 106/DIG. 1; 264/DIG. 49; 65/33.1; 65/134.8; 588/252; 588/256
[58] Field of Search .................................. 501/1, 57, 63, 501/69, 70, 155, 2; 588/252, 256; 264/DIG. 49; 106/DIG. 1, 705; 65/33.1, 134.8

[56] References Cited

U.S. PATENT DOCUMENTS

| | | | |
|---|---|---|---|
| 3,384,508 | 5/1968 | Bopp et al. | 428/332 |
| 3,498,775 | 3/1970 | Simmons | 65/33 |
| 3,802,892 | 4/1974 | Pirooz | 65/33 |
| 3,840,394 | 10/1974 | Eppler . | |
| 3,900,303 | 8/1975 | Mackenzie | 501/39 |

(List continued on next page.)

FOREIGN PATENT DOCUMENTS

| | | |
|---|---|---|
| 1557957 | 2/1969 | France . |
| 39-51716 | 4/1939 | Japan . |
| 6-247744 | 9/1994 | Japan . |
| 409077530 | 3/1997 | Japan . |
| 113830 | 11/1982 | Poland . |
| 937414 | 6/1982 | U.S.S.R. . |
| 986289 | 3/1965 | United Kingdom . |
| 1163873 | 9/1969 | United Kingdom . |
| 1167812 | 10/1969 | United Kingdom . |
| 1195931 | 6/1970 | United Kingdom . |

OTHER PUBLICATIONS

"Utilization of Fly Ash for Making Acid & Abrasion Resistant Tiles" Aggarwal et al. Cent Glass Ceramic Res. Inst Bull. (1985), 32(4), 103–4, 1985.

"Possible Uses of Paver Plant Ash. III Ash as a Raw mat'l for Prodn of Glazed Floor & Wall Tiles" Srbek Stavivo (1982), 60(9), 332–6.

"Production of Face Tiles From Electric Lamp Prodn. Wastes" Dovnan et al Mezhvuz Tomat SbTr—Leningr Inzh Stroit Inst. pp. 26–29, 1980.

*Primary Examiner*—Paul Marcantoni
*Attorney, Agent, or Firm*—Nixon, Hargrave, Devans & Doyle LLP

[57] ABSTRACT

The present invention relates to a process for forming glass-ceramic tiles. Fly ash containing organic material, metal contaminants, and glass forming materials is oxidized under conditions effective to combust the organic material and partially oxidize the metallic contaminants and the glass forming materials. The oxidized glass forming materials are vitrified to form a glass melt. This glass melt is then formed into tiles containing metallic contaminants.

32 Claims, 4 Drawing Sheets

U.S. PATENT DOCUMENTS

| | | | |
|---|---|---|---|
| 3,929,497 | 12/1975 | Clark-Monks . | |
| 3,942,966 | 3/1976 | Kroyer et al. . | |
| 3,955,990 | 5/1976 | Tochon . | |
| 3,963,503 | 6/1976 | Mackenzie | 501/39 |
| 3,967,971 | 7/1976 | Eppler . | |
| 3,969,122 | 7/1976 | Miller et al. | 501/70 |
| 4,009,015 | 2/1977 | McCollister . | |
| 4,015,045 | 3/1977 | Rinehart | 428/410 |
| 4,053,679 | 10/1977 | Rinehart | 428/410 |
| 4,112,033 | 9/1978 | Lingl . | |
| 4,113,832 | 9/1978 | Bell et al. . | |
| 4,160,809 | 7/1979 | Anderson et al. . | |
| 4,252,551 | 2/1981 | Nishimura . | |
| 4,386,162 | 5/1983 | Beall | 501/3 |
| 4,397,670 | 8/1983 | Beall | 65/33 |
| 4,414,013 | 11/1983 | Connell | 501/155 |
| 4,444,740 | 4/1984 | Snodgrass et al. | 423/483 |
| 4,467,039 | 8/1984 | Beall et al. | 501/3 |
| 4,544,394 | 10/1985 | Hnat | 65/27 |
| 4,621,066 | 11/1986 | Nishigaki et al. | 501/128 |
| 4,640,889 | 2/1987 | Hillig et al. | 501/5 |
| 4,666,490 | 5/1987 | Drake . | |
| 4,735,784 | 4/1988 | Davis et al. | 423/111 |
| 4,755,489 | 7/1988 | Chyung et al. | 501/8 |
| 4,758,538 | 7/1988 | Satoh et al. . | |
| 4,822,388 | 4/1989 | Gee | 65/2 |
| 4,853,350 | 8/1989 | Chen et al. | 201/9 |
| 4,892,846 | 1/1990 | Rogers et al. | 501/8 |
| 4,956,158 | 9/1990 | Nguyen et al. | 423/111 |
| 4,957,527 | 9/1990 | Hnat . | |
| 4,985,375 | 1/1991 | Tanaka et al. | 501/5 |
| 5,008,053 | 4/1991 | Hashimoto et al. | 264/60 |
| 5,024,822 | 6/1991 | Hittner et al. | 423/111 |
| 5,028,567 | 7/1991 | Gotoh et al. | 501/10 |
| 5,035,735 | 7/1991 | Pieper et al. | 65/134 |
| 5,061,308 | 10/1991 | Murakami et al. | 65/18.4 |
| 5,164,174 | 11/1992 | Banker et al. | 423/659 |
| 5,175,134 | 12/1992 | Kaneko et al. | 501/155 |
| 5,188,649 | 2/1993 | Macedo et al. | 501/155 |
| 5,190,895 | 3/1993 | Uchida et al. | 501/32 |
| 5,203,901 | 4/1993 | Suzuki et al. | 501/155 |
| 5,210,057 | 5/1993 | Haun et al. | 501/69 |
| 5,222,448 | 6/1993 | Morgenthaler et al. | 110/346 |
| 5,230,845 | 7/1993 | Hashimoto et al. | 264/56 |
| 5,245,115 | 9/1993 | Barrillon et al. | 588/248 |
| 5,245,116 | 9/1993 | Bontron et al. | 588/248 |
| 5,250,474 | 10/1993 | Siebers | 501/9 |
| 5,273,566 | 12/1993 | Balcar et al. . | |
| 5,304,708 | 4/1994 | Buehler . | |
| 5,312,787 | 5/1994 | Uchida et al. | 501/5 |
| 5,346,549 | 9/1994 | Johnson . | |
| 5,350,716 | 9/1994 | Beall et al. | 501/5 |
| 5,351,630 | 10/1994 | Lister et al. . | |
| 5,352,419 | 10/1994 | Jenkins | 423/126 |
| 5,356,841 | 10/1994 | Mizutani et al. | 501/32 |
| 5,365,012 | 11/1994 | Barrillon et al. | 588/248 |
| 5,366,548 | 11/1994 | Riddle . | |
| 5,369,062 | 11/1994 | Chiang et al. | 501/63 |
| 5,403,664 | 4/1995 | Kurahashi et al. | 428/626 |
| 5,424,042 | 6/1995 | Mason et al. | 422/159 |
| 5,434,333 | 7/1995 | Jantzen et al. | 588/3 |
| 5,476,990 | 12/1995 | Hittner et al. | 588/201 |
| 5,508,236 | 4/1996 | Chiang et al. | 501/155 |
| 5,516,595 | 5/1996 | Newkirk et al. | 428/697 |
| 5,521,132 | 5/1996 | Talmy et al. | 501/155 |
| 5,558,690 | 9/1996 | Hnat et al. | 65/19 |
| 5,571,301 | 11/1996 | Yamaura et al. | 65/335 |
| 5,588,977 | 12/1996 | Pavlov et al. | 501/39 |
| 5,616,160 | 4/1997 | Alexander et al. | 106/DIG. 1 |
| 5,633,090 | 5/1997 | Rodek et al. | 428/428 |
| 5,672,146 | 9/1997 | Aota | 588/256 | ial is then formed into tiles containing metallic
MANUFACTURE OF CERAMIC TILES FROM FLY ASH This application is a continuation of application Ser. No. 08/629,558, filed Apr. 9, 1996 abandoned.

This invention was made with Government support under Contract No. DE-FG02-93ER81555 awarded by the Department of Energy. The Government has certain rights in this invention.

FIELD OF THE INVENTION

This invention relates to the manufacture of glass-ceramic forms, such as tiles, from fly ash.

BACKGROUND OF INVENTION

Solid wastes such as boiler fly ash, auto shredder residue ash, sewage sludge ash, and municipal solid waste incinerator ash account for a major portion of all solid wastes being landfilled in the U.S., and are therefore becoming a major environmental issue. These solid wastes contain heavy metal contaminants which require proper disposal methods to prevent leaching of the heavy metal contaminants into water supplies. This has focused attention on reducing landfilling and on regulations that prevent leachable toxic materials from being disposed of in landfills. Substantial efforts have, therefore, been made to develop uses for these solid waste materials as safe recycled products. Most of the past fly ash utilization efforts have been directed toward high volume usage applications with minimal processing requirements, such as fills, landfill cover, soil stabilization, and highway base courses. These efforts, however, have not adequately prevented the heavy metal contaminants from leaching into the environment.

Attempts have also been made to utilize fly ash in the production of cement, concrete, or other construction materials. U.S. Pat. No. 4,758,538 to Satoh, et al. discloses a process used to produce a foam ceramic body suitable as a building material by mixing various ceramic-forming materials with a blowing agent and heating the resulting mixture to 800° to 1000° C. at which temperature the mixture melts and softens. A clay or fly ash may be added to the mixture. The foam ceramic body is produced by forming the softened mixture into the desired shape, and then gradually cooling.

U.S. Pat. No. 5,346,549 to Johnson discloses a method of producing blocks or slabs from a mixture of fly ash and papermill waste. The fly ash, papermill waste, and a metal binding composite or heavy metal sequestering agent, are mixed together along with an oxidizer, fed on to a conveyor in a 1" thick layer, and exposed to electromagnetic energy, such as ultraviolet radiation, to soften the mixture and facilitate an oxidation reaction. The material can then be fabricated into products and dried at room temperature.

U.S. Pat. No. 5,366,548 to Riddle discloses a process of forming construction blocks which can encapsulate hazardous materials. Fly ash, bottom ash, water, additives, and hazardous material (if desired), are blended together to form a mixture which is then compressed under high pressure to form a fly ash body which is suitable for use as a construction material.

U.S. Pat. No. 4,112,033 to Lingl discloses a method of producing a brick or other ceramic product by mixing sewage sludge with clay, drying the mixture, and firing the dried mixture in a conventional kiln to oxidize the organic portions contained in the sludge into the bricks. Toxic exhaust gases, which are released during the mixing and drying stages, are vented to the kiln to undergo oxidation.

U.S. Pat. No. 5,273,566 to Balcar, et al. discloses a process of manufacturing glass abrasive particles by mixing waste materials comprising aluminum oxide and heavy metals (such as emission control dust or fly ash) with glass forming materials, heating the mixture in an oxidizing environment to oxidize the organic compounds and heavy metals so that the heavy metal oxides are vaporized and exhausted to a scrubber, and melting the remaining mixture to form a glasseous substance, which is quenched to form an abrasive material.

Although these procedures have been found to be useful in converting fly ash to a form useful as an end product, they do not sufficiently oxidize the organic materials and the metallic contaminants in the fly ash to produce a glass-ceramic product of uniform quality. Further, none of these procedures produce a high-value end product with significant market demand. As a result, economic justification for the capital and operational costs of implementing such procedures for disposal of fly ash tend to be problematic. The present invention is directed to overcoming these deficiencies.

SUMMARY OF THE INVENTION

The present invention relates to a process for forming glass-ceramic objects, such as tiles. Fly ash containing organic material, metal contaminants, and glass forming materials is oxidized under conditions effective to combust the organic material and partially oxidize the metallic contaminants and the glass forming materials. The oxidized glass forming materials are vitrified to form a glass melt. This glass melt is then formed into tiles containing metallic contaminants.

Another aspect of the present invention relates to a glass-ceramic form having the composition of 2 to 7 wt. % $Na_2O+K_2O$, 15 to 27 wt. % $Al_2O_3$, 15 to 25 wt. % CaO, 5 to 15 wt. % MgO, 5 to 12 wt. % $Fe_2O_3$, 35 to 55 wt. % $SiO_2$, 0 to 1 wt. % F, 0 to 10 wt. % $TiO_2$, 0 to 5 wt. % $ZrO_2$, 0 to 10 wt. % $P_2O_5$ wt. %, 0 to 5 wt. % other oxides and a breaking strength of from 600 to 1200 lbs. for typical forms.

DETAILED DESCRIPTION OF THE INVENTION

Figure 1:
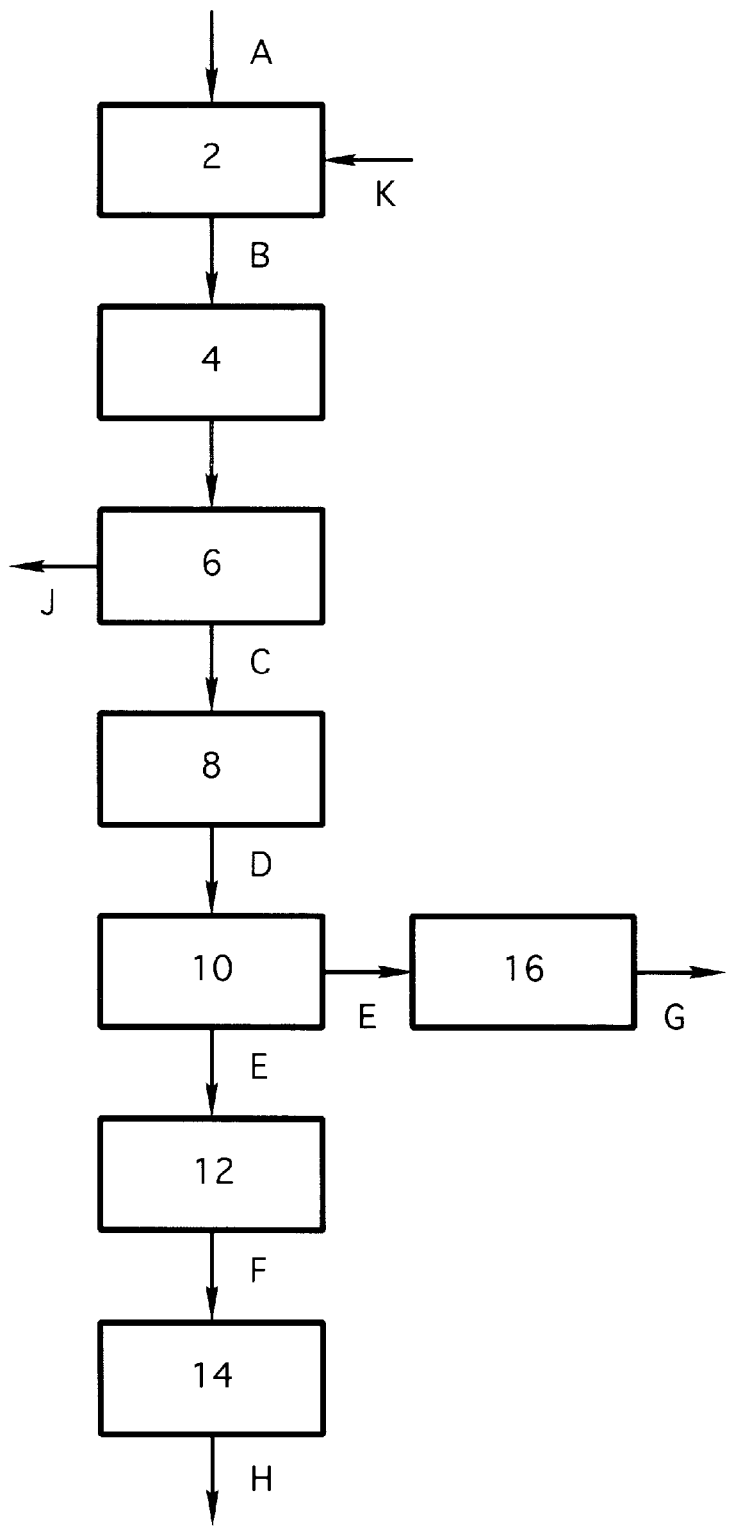
FIG. 1 is a schematic flow diagram of the process of the present invention.

The present invention relates to a process for forming glass-ceramic objects, such as tiles. Fly ash containing organic material, metal contaminants, and glass forming materials are oxidized under conditions effective to combust the organic material and partially oxidize the metallic contaminants in the glass forming materials. The oxidized glass forming materials are vitrified to form a glass melt, and this glass melt is then formed into objects containing metallic contaminants.

Fly ash (utility boiler ash, municipal solid waste incinerator ash, auto shredder residue ash, etc.) is primarily comprised of glass forming materials such as silicon dioxide, aluminum oxide, and calcium oxide. Metallic contaminants and organic material are also present. The composition of typical examples of fly ash is given in Table 1.

TABLE 1

Composition of Typical Flyashes

| Compound | Boiler Flyash | Auto Shredder Residue Ash | Sewage Sludge Ash | Municipal Solid Waste Incinerator Ash |
|---|---|---|---|---|
| $SiO_2$ | 51.80 | 32.6 | 39.51 | 29.5 |
| $K_2O$ | 2.68 | | .54 | 1.57 |
| $Na_2O$ | 0.40 | | .98 | 4.05 |
| $Al_2O_3$ | 25.60 | 9.97 | 9.34 | 11.6 |
| CaO | 1.74 | 6.4 | 14.03 | 28.2 |
| MgO | 0.80 | | 2.52 | 1.8 |
| $Fe_2O_3$ | 10.30 | 23.65 | 8.83 | 2.77 |
| $P_2O_5$ | <0.10 | | 12.58 | |
| $TiO_2$ | 0.20 | | | |
| $Ag_2O$ | | | .0085 | <0.0010 |
| BaO | | | .21 | 0.11 |
| CdO | | | 0.0005 | 0.0065 |
| $Cr_2O_3$ | | 0.06 | 0.5 | 0.09 |
| PbO | | 0.82 | 0.109 | 0.36 |
| MnO | | 0.22 | | |
| ZnO | | 3.07 | | |
| $As_2O_3$ | | | | 0.0034 |
| C | 2.00 | 9.55 | | 6.25 |
| $SO_3$ | 1.50 | 0.36 | .19 | 6.25 |
| F | | | | 0.01 |
| Se | | | 0.0002 | <1 ppm |
| Cl | | | | 6.8 |
| Hg | | | 0.0006 | 0.02 |

The additives which may be mixed with the fly ash are chosen in a manner to render a composition that can be melted with relative ease and, most importantly, can be crystallized to produce a glass ceramic. The preferred additives include soda-lime-silica glass cullet, electric arc furnace dust, limestone, gypsum, silica sand, alkaline earth metal oxides, alkali metal oxides, zinc oxide, borates, and/or nucleating agents. The preferred nucleating agents are titanium dioxides, zirconium oxide, phosphates, fluorides, Ag, and/or Au. Typical compositions of two types of glass forming additives are shown in Table 2.

TABLE 2

Composition of Typical Electric Arc Furnace Dust and Gypsum

| Compound | Electric Arc Furnace Dust (all metals expressed as oxides) | Gypsum |
|---|---|---|
| $SiO_2$ | 3–8% | |
| $Al_2O_3$ | 0–2% | |
| $Fe_2O_3$ | 45–60% | |
| CaO | 4–8% | 32.6 |
| MgO | 1–5% | |
| $Na_2O$ | 1–5% | |
| $K_2O$ | 1–4% | |
| $TiO_2$ | 0–0.5% | |
| $P_2O_5$ | 0–1.0% | |
| $Mn_2O_3$ | 3–9% | |
| SrO | 0–1% | |
| CuO | 0–1% | |
| NiO | 0–0.5% | |
| CrO | 0–1% | |
| $V_2O_5$ | <0.01 | |
| ZnO | 10–16% | |
| PbO | 0–3% | |
| C | 0–5% | |

TABLE 2-continued

Composition of Typical Electric Arc Furnace Dust and Gypsum

| Compound | Electric Arc Furnace Dust (all metals expressed as oxides) | Gypsum |
|---|---|---|
| $SO_3$ | <0.01 | 46.5 |
| F | | |
| CN | | |
| Loss on Ignition | 3–10% | 21.0 (mostly water) |

The proportion of additives used in the process of the present invention is typically 60 to 100 wt. % flyash (utility boiler, municipal solid waste incinerator ash, and/or auto shredder residue ash), 0 to 40 wt. % limestone, gypsum, or dolomite, 0 to 30 wt. % silica, 0 to 20 wt. % soda-lime-silicate glass cullet, 0 to 2 wt. % titania, and 0 to 5 wt. % zirconia. A preferred feedstock to the process of the present invention is 2 to 7 wt. % $Na_2O+K_2O$, 15 to 27 wt. % $Al_2O_3$, 15 to 25 wt. % CaO, 5 to 15 wt. % MgO, 5 to 12 wt. % $Fe_2O_3$, 35 to 55 wt. % $SiO_2$, 0 to 2 wt. % F, 0 to 10 wt. % $TiO_2$, 0 to 5 wt. % $ZrO_2$, 0 to 10 wt. % $P_2O_5$, and 0 to 5 wt. % other oxides. The other oxides include oxides of Cu, Mn, Cr, Ni, Zn, As, Pb, Ag, Au, and S, or mixtures thereof.

The process of the present invention follows the process flow diagram shown in FIG. 1. In this process flow scheme, fly ash A containing organic material, metallic contaminants, and glass forming materials is sent to a blender 2 from steel or cement storage vessels. Additives K (e.g., limestone), if required, can also be transferred from additive storage bins and added at this step. Blender 2 mixes fly ash A and additives K to form homogeneous mixed composition B. Typically, blender 2 is a pneumatic or mechanical blender.

Mixed composition B is then conveyed to an oxidizing apparatus 4 where organic material in fly ash A containing glass formers and other additives K are combusted, heated, and then delivered to melting apparatus 6 where glass forming materials are vitrified. In oxidizing apparatus 4, oxidation is carried out at a temperature of 1000° C. to 1500° C. and a pressure of 0.9 to 1.1 atmospheres, preferably by suspension oxidation. In melting apparatus 6, vitrification is achieved at a temperature of 1200° C. to 1550° C. and at a pressure of 0.9 to 1.1 atmospheres, preferably using a cyclone melter. Bath, pot, open-hearth, or electric melters may also be utilized.

Figure 2:
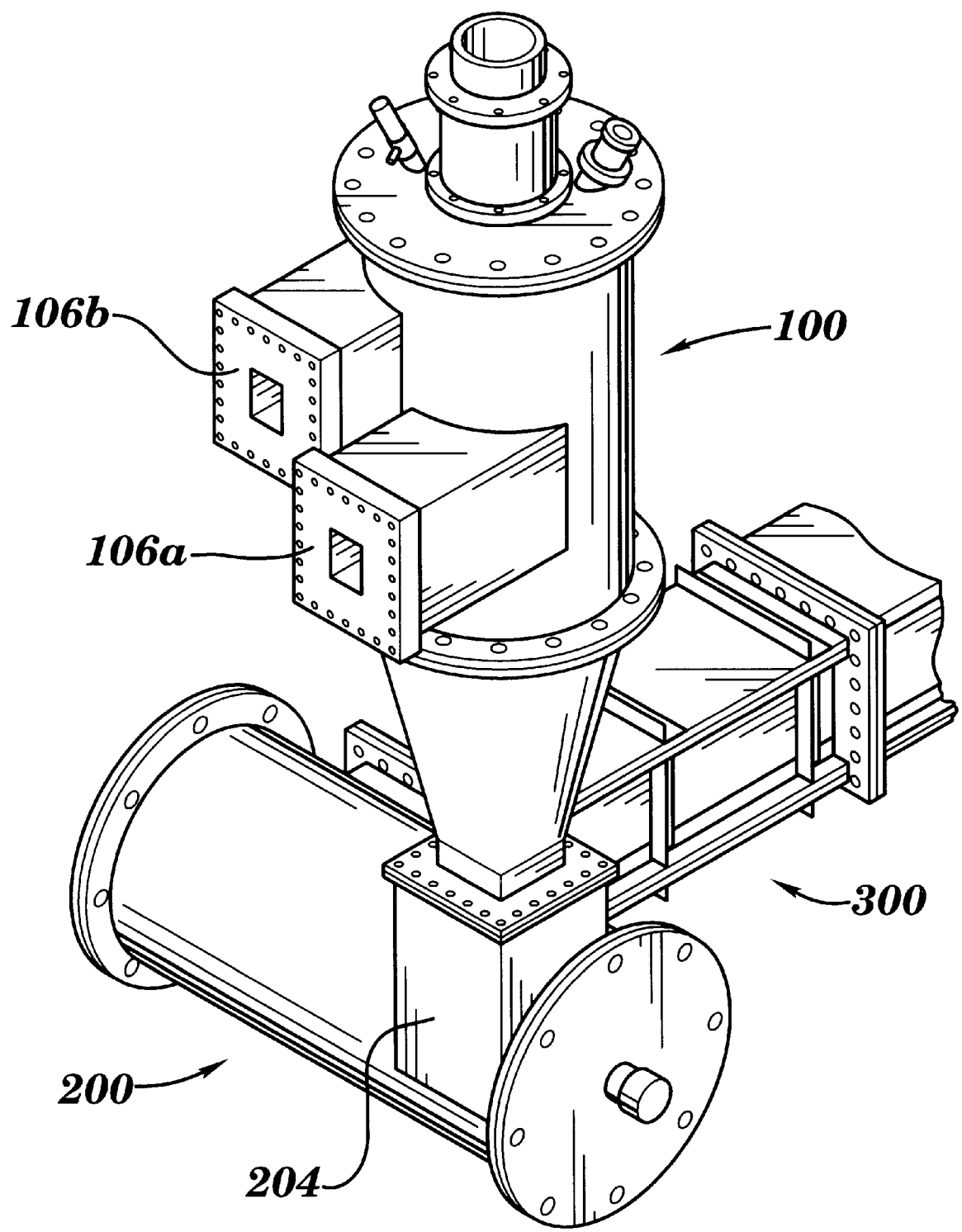
FIG. 2 is a perspective view of an apparatus useful in carrying out the process of the present invention.
Figure 3:
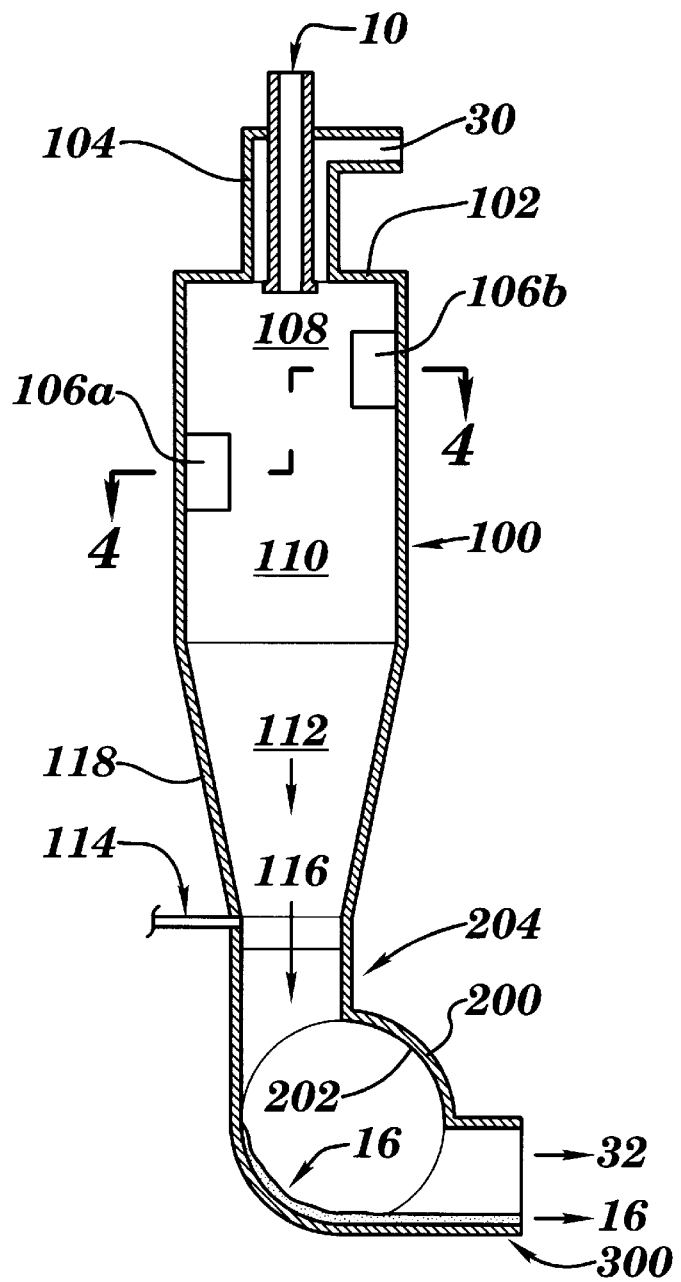
FIG. 3 is a side cross sectional view of the apparatus of FIG. 2.
Figure 4:
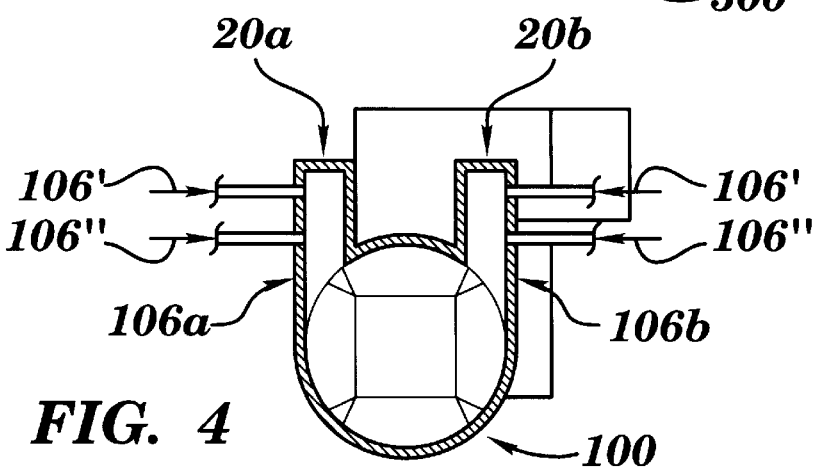
FIG. 4 is a top cross sectional view of the apparatus of FIG. 3 taken along line 4—4.

A particularly preferred form of oxidizing apparatus 4 and melting apparatus 6 is the Combustion and Melting System manufactured by Vortec Corporation, Collegeville, Pa. This system is shown in FIGS. 2, 3, and 4 and is described in more detail in U.S. Pat. No. 4,957,527 to Hnat, which is hereby incorporated by reference. See also U.S. Pat. No. 4,544,394 to Hnat, which is hereby incorporated by reference.

FIG. 2 is a perspective view of the Combustion and Melting System used to practice the process of the present invention. The primary components of the apparatus of the invention include a suspension-type preheater chamber 100, cyclone melting chamber 200 at the discharge end of the preheater chamber 100, and cyclone exit assembly 300 at the discharge end of melting chamber 200. Other components, such as a gasifier and plasma torch preheater can be incorporated into this system. See U.S. Pat. No. 4,957,527.

As shown in FIG. 3, fuel 30 is introduced into top or head end 102 of the preheater 100. Fuel 30 is introduced along with glass batch material 10 through injector assembly 104 which is located at head end 102 of preheater 100 and which is coaxial with the longitudinal axis of the preheater chamber 100.

The preheating step is very important to the invention. The well stirred/plug flow suspension preheater 100 enhances convective heat transfer to particulate matter, while providing combustion stabilization when combustion occurs within the preheater vessel. Due to the intense mixing, rapid heat release in the combustion processes takes place. By selecting the proper injection location and velocity, the interaction of the particulate mineral matter with the walls of the preheater can be either minimized or maximized. Axial injection will tend to minimize interaction with the preheater wall, while tangential injection tends to maximize the interaction with the reactor wall, particularly where high levels of swirl are utilized.

As shown in FIG. 4, preheated air or other suitable gaseous oxidizing material 20a, 20b is introduced into preheater 100 through two or more inlet ports 106a, 106b. These gaseous oxidizing materials 20a, 20b are introduced in such a manner that they produce turbulent mixing of injected fuel 30 with oxidizing material 20a, 20b and glass batch material 10 (i.e. crusted composition B from FIG. 1). The result is a mixture of fuel, oxidizer, and glass forming materials in upper region 108 of preheater 100. Within upper region 108, the gases present are well stirred or well mixed, but particulate matter (e.g., glass forming materials) in region 108 is not necessarily well stirred or evenly distributed throughout the volume of region 108.

When a counter-rotating preheater is used, as shown in FIGS. 3 and 4, inlet ports 106a, 106b are tangential to the vessel walls and are spaced at different levels. The jets are typically vertically spaced on the order of ¼ to 2 reactor diameters apart.

The combustion of fuel 30 and oxidizing material 20a, 20b within upper region 108 of preheater 100 results in a high intensity heat release and further results in a rapid rate of heat transfer to the particulate matter (e.g. the glass forming materials) suspended in the gas flow within this region. Burning within the preheater occurs via the mixing and stirring of fuel and oxidizer within the well-stirred region of the reactor. Ignition occurs within the preheater with the aid of a pilot burner or conventional electrical ignition assembly. In the preferred embodiment, high temperature air preheat (>500° C.) is provided via a commercially available heat recuperator. In these cases, radiation from the preferred refractory lined reactor walls will generally establish auto ignition of the various fuel and oxidizer mixtures to be used. Strong recirculation in upper region 108 of preheater 100 is created by counter-rotating vortices or impinging jets, thus providing the primary means of flame stabilization within the preheater. Without this strong recirculation of the combustion gases, flame extinguishment tends to occur due to the quenching of the flame by inert batch materials or other mineral matter within the preheater assembly. This is particularly true of mineral matter, such as limestone, which liberates substantial amounts of $CO_2$ upon heating. When low heating value fuels are used, auxiliary gas injection, separate igniters, or pilot burners can also be used to achieve flame stabilization within the preheater.

When preheater 100 is a cylindrical-type combustion chamber, primary flame and heat release occurs in upper region 108 which occupies a chamber volume with a length to diameter ratio of approximately 0.5:1–3.0:1, preferably 1:1. The strong mixing of the fuel and oxidizer within this region permits the effective combustion of many types of fuels, including gaseous, liquid, solid or liquid-solid slurry type fuels.

Downstream of upper region 108 within the preheater 100 is lower or plug flow region 110 where a plug flow of gas and solid or liquid particles is produced and where final combustion of fuel 30 is completed. By plug flow, it is meant that gas recirculation patterns have abated and the primary direction of flow is parallel to the longitudinal axis of the reactor. The effective length-to-diameter ratio of plug flow region 110 is, again, approximately 0.5:1–3.0:1, preferably, 1:1. The gaseous materials, fuel 30, oxidizers 20a, 20b, and entrained glass batch materials 10 within plug flow region 110 are accelerated through converging section 112 of preheater chamber 100. From converging section 112, the gas and entrained batch materials are delivered into cyclone-type melting chamber 200 where secondary combustion occurs at an average temperature which exceeds the melting point of the glass product, and where separation, dispersion, mixing, and melting of the preheated batch materials occurs along walls 202.

It is the intention of the present invention to heat the batch materials in suspension and to minimize liquid glass formation along the walls of preheater 100. However, when low melting point species are included as part of the batch mixture, some liquid glass species formation will occur along the walls of the preheater by vapor phase condensation or by turbulent deposition.

Melted glass product 16 formed on walls 202 of cyclone melting chamber 200 and hot gases 32 from cyclone chamber exit cyclone melting chamber 200 through exhaust duct assembly 300 which is preferably positioned tangential to the walls of the cyclone melting chamber. An exit channel along the longitudinal axis of the cyclone melter is also possible. It is also desireable to separate the exhaust products from melted glass product 16 in a gas separation and interface assembly. In this arrangement, melted glass product 16 and hot gases 32 exit the cyclone melting chamber 200 through a tangential exit channel into a reservoir (not shown). Hot gases 32 exit the reservoir through an exhaust port located in the reservoir roof. The reservoir also provides sufficient amounts of melted glass product 16 for interfacing with the downstream tile forming equipment.

Returning to FIG. 1, in this form of oxidizing apparatus 4, rapid carbon burnout takes place in the initial stages of the thermal treatment when finely divided fly ash and additives K are suspended in a highly turbulent oxygen rich combustion region of a suspension preheater. The suspension preheater preferably is a counter/rotating vortex combustor. During oxidation of the mixed composition, all of the organic material and most of the metallic contaminants present are oxidized prior to separation and melt formation, therefore, the glass produced has uniform quality, with little or no refractory stones. The combustion by-products are released from the system in the form of flue gas J. A flue gas cleanup assembly may be provided to remove particular matter from flue gas J and to exhaust the cleaned combustion products to the atmosphere.

Portions of mixed composition B which are not melted in melting apparatus 6 into molten mass C are withdrawn in flue gas J. Molten mass C is removed from melting apparatus 6 and fed to shape fabrication machinery 8 where it is pressed into objects, such as tiles of desired shapes and sizes. Shape fabrication machinery 8 is a molding machine conventionally used in the glass industry. During shape forming, molten mass C, consisting of vitreous materials, cools down and becomes a rigid solid as it is formed into the shape of a tile. The most desireable tile shapes are 4"×4", 8"×8", 12"×12", and 18"×18" tiles of varying thicknesses, typically in the range of ¼" to 1".

Shaped material D produced by shape fabrication machine 8 is heat treated to induce nucleation and crystallization. This heat treatment takes place in the heat treatment kiln 10. A typical heat treatment for nucleation and crystallization cycle is shown in FIG. 5.

Figure 5:
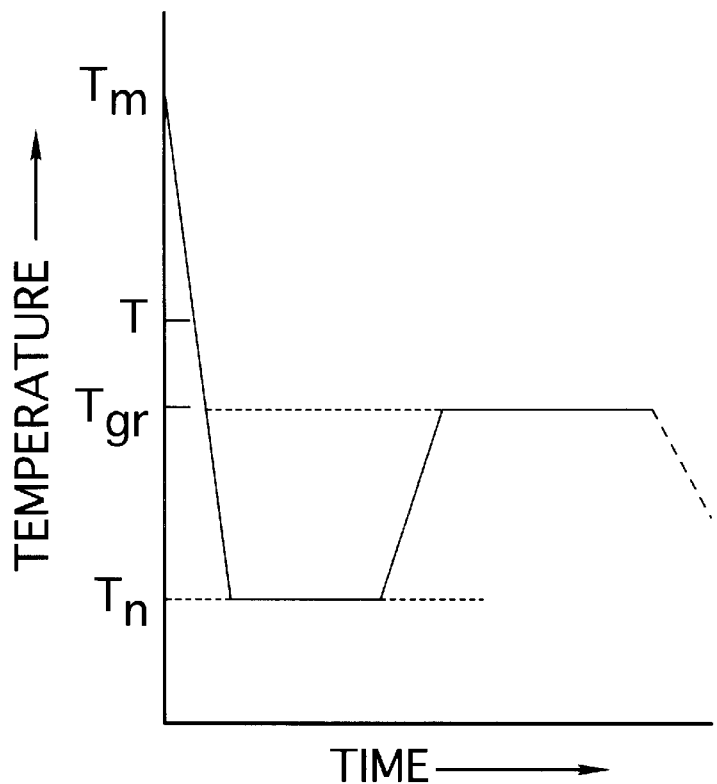
FIG. 5 is a plot of temperature versus time to depict the thermal treatment of shaped material in a heat treatment kiln.

During a first time period, shaped material D in heat treatment kiln 10, is cooled from its melting temperature, $T_m$ (i.e., the temperature of molten mass D in melting apparatus 7) to the nucleation temperature, $T_n$, as shown in FIG. 5. This phase, which typically takes between 1–5 minutes, reduces the temperature of shaped material D to a value of 400° to 600° C., a temperature at which nucleation occurs. Typically, the rate of temperature reduction is 50° to 200° C./hour to $T_n$. Such nucleation is facilitated by incorporating a nucleating agent in feed stream K as discussed above.

To cause crystallization, shaped material D is next subjected to a second phase heat treatment in which it is held at $T_n$ for a time period of between 30 minutes to 2 hours, as shown in FIG. 5. During this phase of the process, shaped material D is subjected to a temperature of 800° to 900° C. The purpose of this second phase heat treatment is to create nuclei for further crystallization.

In a third phase heat treatment, as shown in FIG. 5, shaped material D is reheated to crystallization temperature, $T_{gr}$ (i.e. 950°–1150° C.), and held for between 30 minutes to 2 hours. The time required for the heat treatment cycle is dependent upon the amount and type of nucleating agent used with the additives. During this temperature increase, the temperature of shaped material D is increased at a rate 50° to 200° C./hour. Typically, $T_{gr}$ is 950° to 1150° C.

The heat treatment process shown in FIG. 5 results in the formation of glass-ceramic tile E. Following such heat treatment, the glass-ceramic tile E either is delivered directly to hot glazing apparatus 16 or is removed from the heat treatment kiln 10 and allowed to cool prior to treatment in cold glazing apparatus 12.

The glass-ceramic tile E is typically glazed to produce glass-ceramic tiles with various colors and textures. Suitable glazes are commercially available and are similar to those used in current tile making practice.

Figure 6:
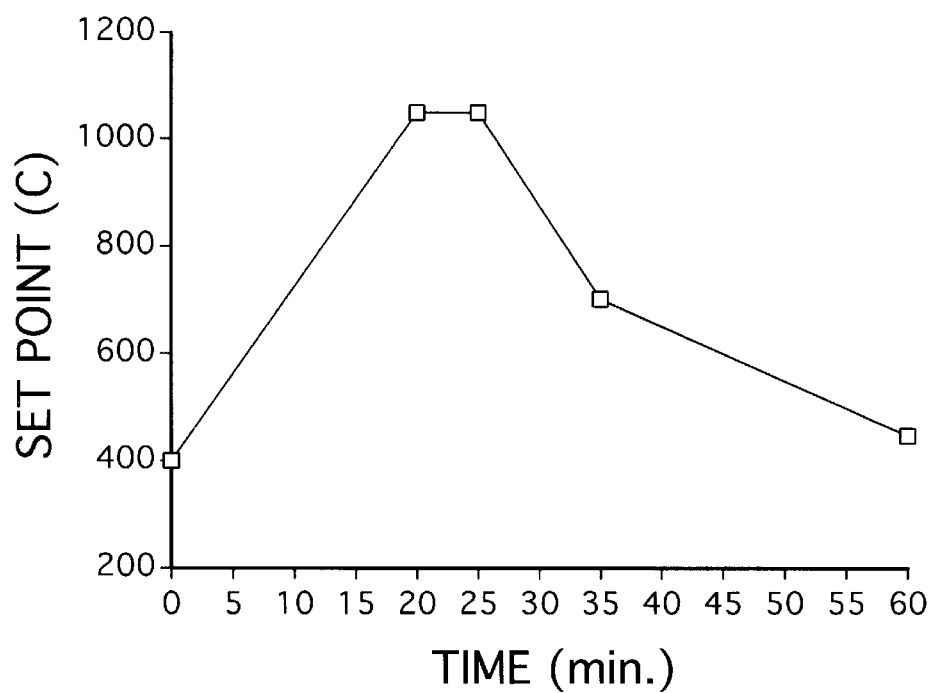
FIG. 6 is a plot of temperature versus time to depict the thermal treatment of the glaze in a hot glazing apparatus.

The glass-ceramic tile E may be treated in hot glazing apparatus 16 to produce hot glazed tile G. Such hot glazing typically involves applying a dry glaze powder on the surface of the hot tile body immediately after crystallization. A typical glaze heat treatment cycle is shown in FIG. 6. Temperatures typically used in hot glazing apparatus 16 range from 800° to 1400° C., with the desirable maximum temperature being 1060° C. The most desirable firing time is 55 minutes.

Alternatively, glass-ceramic tile E may be treated in cold glazing apparatus 12 to produce cold glazed tile F. The glaze is applied to glass-ceramic tile E using various devices such as glazing bells, rotating discs, air assisted spray guns, or other conventional tile glaze application techniques. Cold glazed tile F is dried in air at ambient temperatures and then fired at a low temperature, typically from 530° to 850° C. To avoid excessive stress buildup, cold glazed tile F is next cooled slowly (i.e., at a rate of 25–100° C./hour) to room temperature, depending on tile thickness. Low temperature glazing produces a glass-ceramic tile which is opaque rather than translucent, imparting a gloss to the surface rather than the "depth" the tile. Cold glazed tile F may then be heated in heating apparatus 14, at a temperature of 800° to 1000° C., to produce a glazed tile H.

Properties of glass-ceramic tiles E include thermal stability up to 1100° C., chemical durability equivalent to or better than the commercial glasses, and mechanical strength equal to or better than that of commercial ceramic tiles, i.e. a breaking strength in excess of 600 lbs. Typically, the tiles have a breaking strength of from 600 to 1200 lbs. for typical floor tiles with 7.5 mm thickness. In comparison, conventional clay-based tiles have breaking strengths less than 200 lbs. The most desirable glass-ceramic tile composition obtained from the above mixed composition B will consist of 2 to 7 wt. % $Na_2O+K_2O$, 15 to 27 wt. % $Al_2O_3$, 15 to 25 wt. % CaO, 5 to 15 wt. % MgO, 5 to 12 wt. % $Fe_2O_3$, 35 to 55 wt. % $SiO_2$, 0 to 2 wt. % F, 0 to 10 wt. % $TiO_2$, 0 to 5 wt. % $ZrO_2$, 0 to 10 wt. % $P_2O_5$, and 0 to 5 wt. % other oxides. Preferably, the other oxides will be oxides of copper, manganese, chromium, nickel, zinc, arsenic, lead, gold, silver, sulfur, and mixtures thereof.

EXAMPLES

EXAMPLE 1

A mixture of 70 wt. % coal fired boiler fly ash and 30 wt. % limestone with a particle size less than 400 microns was melted in the Combustion and Melting System (Vortec Corporation, Collegeville, Pa.) at a maximum temperature of 1450° C. The molten material was quenched in water to form a glass cullet. This glass cullet was placed in an alumina crucible and remelted at 1450° C. in an electric box furnace. The molten glass was then poured into a steel mold to fabricate the shape of a 4"×4" tile. The tile was heat treated in an electric oven by holding it at the nucleation temperature of 750° C. for 1 hour and at a crystallization temperature of 1000° C. for 2 hours.

EXAMPLE 2

Testing was performed to determine various properties of the glass-ceramic tiles. The properties were measured following ASTM methods.

Dimensional Stability of the Tile

The quality control requirements for the wall tiles are as following:

1. The required tile dimensions: 4-¼"×4-¼"×0.295"
2. Dimensional tolerance+/−0.015"
3. Warpage not to exceed 0.025" across diagonal The above tolerances were checked by a commercial tile manufacturer using the ASTM designation C485-83 for warpage and ASTM C499-78 for facial dimensions. The glass-ceramic tiles meet the above stated requirements.

Breaking Strength

The breaking strength of the glass-ceramic tiles was measured by using ASTM designation C648-84. The experiment was conducted by a commercial tile manufacturer using the instrumentation constructed to the specifications of ASTM C648-84. The strength of the glass-ceramic tile exceeded 600 lb, which is 3–6 times the strength of a conventional wall tile. Higher breaking strength is a desirable attribute in all construction tiles provided the tiles may be cut into smaller pieces by the conventional techniques used by the tile installers. The glass-ceramic tiles studied in this research can be cut using the traditional equipment.

Water Absorption

The glass-ceramic tiles are derived from vitreous materials which generally do not have any porosity. The glass-ceramics are free of porosity to a large extent as well, but in some cases, due to the thermal expansion difference between the glass and the glass-ceramics, some small amount of porosity (<0.5%) may develop during the ceramming process. The water absorption tests (ASTM C373-72) indicated no weight gain in any of the glass-ceramics made in this research.

Crazing

This test was performed by a ceramic tile manufacturer to determine the crazing resistance of the fired, glazed, glass-ceramic tiles using the autoclave treatment according to the ASTM designation C424-80.

This test involved placing the tile inside an autoclave on a suitable support. Sufficient amount of water was added, and the autoclave was closed securely. The water was heated gradually, and the blow-off valve of the autoclave was closed after steam began to escape, thereby expelling most of the air. The pressure was allowed to increase at a constant rate for about 45 minutes to the desired value. This pressure was kept constant for one additional hour. The heat source was then shut off and the pressure was released. The specimen was removed from the autoclave after it cooled to room temperature. The tile surface was examined by naked eye for crazing failure.

The first test was made at the maximum pressure of 50 psi; no crazing occurred. The test was repeated at 100, 150, 200, and 250 psi. None of the samples crazed.

Thermal Shock Resistance of Glazed Tiles

This test was performed at a commercial tile manufacturer to determine the thermal shock resistance of the fired, glazed, glass-ceramic tiles according to the ASTM designation C484-66.

The method consisted of placing the glazed sample in an oven at a temperature of 145° C. (+/−5° C.), for 30 minutes, removing it from the oven, placing it on a thin sheet of aluminum maintained at 24° C. (+/−3° C.), and inspecting the tile after 15 minutes for shivering or any other type of disintegration. The undamaged tile was returned to the oven and the same cycle was repeated for five times. The glazed, glass-ceramic tiles survived all the thermal shock cycles.

Hardness

The hardness of glass-ceramic tiles was measured by the Knoop indentation hardness tester. These data were converted to Mohs scale.

On Mohs scale, the hardness of glass-ceramics is close to 7. Hardness of a conventional bisque is considerably less.

For the wall and floor tile glazes, the hardness test was conducted by using Mohs standard scratch test. The hardness values for wall and floor tiles was 6.5 and 7.5, respectively, on the Mohs scale.

Resistance to Freeze-Thaw Cycling

This test was performed by a commercial tile manufacturer to determine the resistance to freeze-thaw cycling of the fired, glazed, glass-ceramic tiles according to the ASTM designation C1026-84.

The test procedure consisted of placing a water saturated tile sample in a freezer maintained at −18° C. for a short time and then placing the tile in water maintained at 16° C. The tile was removed from the water after thawing and examined for any damage. The freezing and thawing was done 5 times on the same sample. The glass-ceramic samples survived the cycling without any damage when observed under ultraviolet light.

Thermal Expansion

The thermal expansion of the glass-ceramic samples was measured primarily to find a suitable glaze for surface decoration. The coefficient of thermal expansions of various compositions are (80 to 110)×$10^{-7}$/°C.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process of forming glass ceramic tiles comprising:

providing a spent ash containing organic material, metallic contaminants, and glass forming materials;

oxidizing the spent ash under conditions effective to oxidize the organic material and to partially oxidize the metallic contaminants and the glass forming materials, wherein said oxidizing is carried out in a suspension preheater in which the ash containing the organic material, metallic contaminants, and glass forming materials is suspended in an oxidizing fluid;

vitrifying the oxidized glass forming materials to form a glass melt;

forming the glass melt into glass ceramic tiles containing metallic contaminants.

2. A process according to claim 1, wherein said suspension preheater is a counter-rotating vortex suspension preheater.

3. A process according to claim 1, wherein said vitrifying is carried out in a cyclone melting chamber.

4. A process according to claim 1, wherein said vitrifying is carried out in a cyclone melting chamber.

5. A process according to claim 1, wherein said vitrifying is carried out in an open-hearth melter.

6. A process according to claim 1, wherein said vitrifying is carried out in an electric melter.

7. A process according to claim 1, wherein said oxidizing is carried out at a temperature of 1000° to 1500° C.

8. A process according to claim 1, wherein said vitrifying is carried out at temperature of 1200° to 1550° C.

9. A process according to claim 1 further comprising:

mixing the fly ash with an additive selected from the group consisting of limestone, dolomite, gypsum, silica, sodium-lime-silica glass cullet, titania, zirconia, and mixtures thereof prior to said oxidizing to form a mixture.

10. A process according to claim 9, wherein the mixture contains 60 to 100 wt. % flyash, 0 to 40 wt. % limestone, 0 to 40 wt. % dolomite, 0 to 40 wt. % gypsum, 0 to 30 wt. % silica, 0 to 20 wt. % sodium-lime-silica glass cullet, 0 to 10 wt. % titania, and 0 to 5 wt. % zirconia.

11. A process according to claim 7, wherein the tiles contain 2 to 7 wt. % $Na_2O+K_2O$, 15 to 27 wt. % $Al_2O_3$, 15 to 25 wt. % CaO, 5 to 15 wt. % MgO, 5 to 12 wt. % $Fe_2O_3$, 35 to 55 wt. % $SiO_2$, 0 to 2 wt. % F, 0 to 10 wt. % $TiO_2$, 0 to 5 wt. % $ZrO_2$, 0 to 10 wt. % $P_2O_5$, and 0 to 5 wt. % other oxides.

12. A process according to claim 11, wherein the other oxides are selected from the group consisting of oxides of copper, manganese, chromium, nickel, zinc, arsenic, lead, gold, silver, sulfur, and mixtures thereof.

13. A process according to claim 1 further comprising:

cooling the tiles to effect nucleation and heating the tiles after said cooling to cause crystallization of said tiles.

14. A process according to claim 13 further comprising:

heat treating the tiles after said heating to cause crystallization and glazing the heat treated tiles.

15. A process of forming glass ceramic tiles comprising:
providing an ash containing organic material, metallic contaminants, and glass-forming materials;
oxidizing the ash under conditions effective to oxidize the organic material and to partially oxidize the metallic contaminants and the glass forming materials, wherein said oxidizing is carried out in a suspension preheater in which the ash containing the organic material, the metallic contaminants, and glass-forming materials is entrained in an oxidizing fluid;
vitrifying the oxidized glass-forming materials to form a glass melt, wherein said vitrifying is carried out in a cyclone melting chamber;
forming the glass melt into tiles containing the metallic contaminants;
cooling the tiles to effect nucleation;
heating the tiles after said cooling to cause crystallization of said tiles, whereby the tiles become a glass ceramic; and
glazing the heat treated tiles.

16. A process of forming glass ceramic tiles comprising:
providing a spent ash containing organic material, metallic contaminants, and glass forming materials;
oxidizing the spent ash under conditions effective to oxidize the organic material and to partially oxidize the metallic contaminants and the glass forming materials;
vitrifying the oxidized glass forming materials to form a glass melt; and
forming the glass melt into glass ceramic tiles containing metallic contaminants, wherein crystals are not formed in the glass melt until said forming.

17. A process according to claim 16, wherein said oxidizing is carried out in a suspension preheater.

18. A process according to claim 17, wherein the suspension preheater is a counter-rotating vortex suspension preheater.

19. A process according to claim 16, wherein said vitrifying is carried out in a cyclone melting chamber.

20. A process according to claim 16, wherein said vitrifying is carried out in an open-hearth melter.

21. A process according to claim 16, wherein said vitrifying is carried out in an electric melter.

22. A process according to claim 16, wherein said oxidizing is carried out at a temperature of 1000 to 1500° C.

23. A process according to claim 16, wherein said vitrifying is carried out at a temperature of 1200 to 1550° C.

24. A process according to claim 16 further comprising:
cooling the tiles to effect nucleation and
heating the tiles after said cooling to cause crystallization of said tiles.

25. A process of forming glass ceramic tiles comprising:
providing a spent ash containing organic material, metallic contaminants, glass forming materials, and a nucleating agent;
oxidizing the spent ash under conditions effective to oxidize the organic material and to partially oxidize the metallic contaminants and the glass forming materials;
vitrifying the oxidized glass forming materials to form a glass melt; and
forming the glass melt into glass ceramic tiles containing metallic contaminants.

26. A process according to claim 25 further comprising:
mixing the ash with an additive selected from the group consisting of limestone, dolomite, gypsum, silica, sodium-lime-silica glass cullet, titania, zirconia, and mixtures thereof prior to said oxidizing to form a mixture.

27. A process according to claim 26, wherein the mixture contains 60 to 100 wt. % ash, 0 to 40 wt. % limestone, 0 to 40 wt. % dolomite, 0 to 40 wt. % gypsum, 0 to 30 wt. % silica, 0 to 20 wt. % sodium-lime-silica glass cullet, 0 to 10 wt. % titania, and 0 to 5 wt. % zirconia.

28. A process according to claim 26, wherein the tile contains 2 to 7 wt. % $Na_2O+K_2O$, 15 to 27 wt. % $Al_2O_3$, 15 to 25 wt. % CaO, 5 to 15 wt. % MgO, 5 to 12 wt. % $Fe_2O_3$, 35 to 55 wt. % $SiO_2$, 0 to 2 wt. % F, 0 to 10 wt. % $TiO_2$, 0 to 5 wt. % $ZrO_2$, 0 to 10 wt. % $P_2O_5$, and 0 to 5 wt. % other oxides.

29. A process according to claim 28, wherein the other oxides are selected from the group consisting of oxides of copper, manganese, chromium, nickel, zinc, arsenic, lead, gold, silver, sulfur, and mixtures thereof.

30. A process according to claim 25, wherein the nucleating agent is selected from the group consisting of titanium dioxide, zirconium oxide, phosphates, fluorides, silver, gold, and mixtures thereof.

31. A process of forming glass ceramic tiles comprising:
providing a spent ash containing organic material, metallic contaminants, and glass forming materials;
oxidizing the spent ash under conditions effective to oxidize the organic material and to partially oxidize the metallic contaminants and the glass forming materials;
vitrifying the oxidized glass forming materials to form a glass melt;
forming the glass melt into tiles containing metallic contaminants;
cooling tiles to effect nucleation;
heat treating the cooled tiles to cause crystallization, whereby the tiles become a glass ceramic; and
glazing the heat treated tiles at an elevated temperature.

32. A process of forming glass ceramic tiles comprising:
providing a spent ash containing organic material, metallic contaminants, and glass forming materials;
oxidizing the spent ash under conditions effective to oxidize the organic material and to partially oxidize the metallic contaminants and the glass forming materials;
vitrifying the oxidized glass forming materials to form a glass melt;
forming the glass melt into tiles containing metallic contaminants;
cooling the tiles to effect nucleation;
glazing the cooled tiles; and
heat treating the glazed tiles, whereby the tiles become a glass ceramic.

* * * * *